United States Patent
Kasai et al.

(10) Patent No.: US 10,081,310 B2
(45) Date of Patent: Sep. 25, 2018

(54) SENSOR BRACKET

(71) Applicant: HONDA MOTOR CO., LTD., Tokyo (JP)

(72) Inventors: Keita Kasai, Wako (JP); Mitsuru Tokiwa, Wako (JP); Tadahiro Matori, Wako (JP); Takahiro Ohmoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 15/467,237

(22) Filed: Mar. 23, 2017

(65) Prior Publication Data
US 2017/0274834 A1 Sep. 28, 2017

(30) Foreign Application Priority Data

Mar. 24, 2016 (JP) .................. 2016-060375

(51) Int. Cl.
B60R 11/04 (2006.01)
F16M 13/02 (2006.01)
G03B 17/56 (2006.01)
B60R 11/00 (2006.01)

(52) U.S. Cl.
CPC ............ B60R 11/04 (2013.01); F16M 13/02 (2013.01); G03B 17/561 (2013.01); B60R 2011/0043 (2013.01)

(58) Field of Classification Search
CPC ............ B60R 2011/0043; B60R 11/04; G03B 17/561; F16M 13/02
See application file for complete search history.

(56) References Cited

U.S. PATENT DOCUMENTS

| | | | | |
|---|---|---|---|---|
| 5,708,410 A | * | 1/1998 | Blank | B60K 35/00 340/438 |
| 5,820,097 A | * | 10/1998 | Spooner | B60R 1/04 248/549 |
| 8,456,311 B2 | * | 6/2013 | Wohlfahrt | B60S 1/0822 248/309.1 |
| 9,707,903 B2 | * | 7/2017 | Rawlings | B60R 11/04 |
| 9,871,971 B2 | * | 1/2018 | Wang | H04N 5/235 |
| 2007/0164188 A1 | * | 7/2007 | Mordau | B60S 1/0822 248/503 |
| 2012/0099849 A1 | * | 4/2012 | Onishi | B60R 11/04 396/419 |

FOREIGN PATENT DOCUMENTS

JP  2013-203250 A  10/2013

* cited by examiner

Primary Examiner — Clayton E Laballe
Assistant Examiner — Linda B Smith
(74) Attorney, Agent, or Firm — Westerman, Hattori, Daniels & Adrian, LLP

(57) ABSTRACT

A sensor bracket includes a bracket on which a camera (a sensor) that detects a state around a vehicle is mounted, a flat spring that abuts against the camera in a direction that maintains a mounted state of the camera when the camera is mounted on the bracket, and a stopper restricting, in between a space where a tool is positioned and an inner surface of a piece of glass, a displacement range of the tool from the space to the inner surface of the piece of glass when the flat spring is dismounted from a projection for the spring of the bracket with the tool.

3 Claims, 3 Drawing Sheets

SENSOR BRACKET

CROSS REFERENCES TO RELATED APPLICATIONS

The present application claims priority under 35 U.S.C. § 119 to Japanese Patent Application No. 2016-060375, filed Mar. 24, 2016, entitled "Sensor Bracket." The contents of this application are incorporated herein by reference in their entirety.

BACKGROUND

1. Field

The present disclosure relates to a sensor bracket used to attach an on-board camera or the like.

2. Description of the Related Art

Hitherto, a technique is known that accurately detects an obstacle and a pedestrian, a position of a traffic lane, whether a headlight of an oncoming vehicle is on, and the like by performing imaging of a portion in front of a vehicle with an on-board camera. In such a case, the on-board camera is mounted on a bracket that is attached to a windshield.

For example, in Japanese Unexamined Patent Application Publication No. 2013-203250, while bosses of an on-board camera main body are hooked to hook-shaped portions, the on-board camera main body is slid from below towards an obliquely upward portion at the rear side and along a glass surface of the windshield to attach the bracket. When performing the above operation, first, the rear surface of the on-board camera main body comes into, contact with, a flat spring, and the flat spring is pushed and deformed by the on-board camera main body.

Furthermore, in a state in which the on-board camera main body is biased towards the front by the flat spring, an engagement protrusion of the on-board camera main body inserted into engagement holes of the bracket is abutted against the front side end portion such that an upper surface of the on-board camera main body is abutted against a back surface of an adhesion portion of the bracket (a surface that is on the side that opposes the on-board camera main body). With the above, the on-board camera main body is fixed while the front side thereof is biased against the bracket with the flat spring (Japanese Unexamined Patent Application Publication No. 2013-203250, paragraphs 0040 to 0043, FIGS. 1 and 5).

SUMMARY

Since the flat spring of Japanese Unexamined Patent Application Publication No. 2013-203250 biases the on-board camera body only in the front direction, the on-board camera body may be unstable in the up-down direction. Accordingly, one may conceive of providing a spring that biases the on-board camera body in the up-down direction in the bracket.

However, in Japanese Unexamined Patent Application Publication No. 2013-203250, since the flat spring is integral with the bracket, when there is a defect in the flat spring, the bracket and all need to be replaced. Accordingly, one may conceive of using a detachable flat spring; however, when replacing a flat spring, one needs to be cautious of not damaging the windshield and the like with the tool.

The present disclosure has been made in view of the above situation and describes a sensor bracket that is capable of safely and easily replacing a spring member for mounting a sensor, such as an on-board camera that detects a state in front of the vehicle, on a bracket body.

A sensor bracket according to the present disclosure includes a bracket body attached to an inner surface of a piece of glass (a glass shield) of a vehicle, a sensor being mounted on the bracket body and detecting a state around the vehicle; a spring member provided in the bracket body, the spring member abutting against the sensor and biasing in a direction that maintains a mounted state of the sensor when the sensor is mounted on the bracket body; and a displacement restriction portion provided in the bracket body, the displacement restriction portion restricting, in between a space where a tool is positioned and the inner surface of the piece of glass, a displacement range of the tool from the space to the inner surface of the piece of glass when the spring member is dismounted from a spring mount portion of the bracket body with the tool.

According to the sensor bracket of the present disclosure, in a case in which the operator dismounts the spring member from the spring mount portion of the bracket body, the operator uses a tool. Furthermore, in order to prevent the tool hitting the windshield and the like and damaging the windshield and the like, the bracket body includes a displacement restriction portion provided between the space in the bracket body where the tool is positioned and the inner surface of the piece of glass, the displacement restriction portion restricting the displacement range of the tool. With the above, the operator can easily and safely dismount the spring member.

In the sensor bracket of the present disclosure, preferably, the displacement restriction portion includes a wall portion that, when the spring member is dismounted from the spring mount portion with the tool having a rod-like shape, restricts the tool so that the tool is orthogonal to the inner surface of the piece of glass when coming in contact with the spring member.

According to such a configuration, when dismounting the spring member from the spring mount portion of the bracket body, since there is a wall portion that restricts the tool having a rod-like shape so that the tool is orthogonal to the inner surface of the piece of glass when coming in contact with the spring member, the tool can be reliably prevented from damaging the windshield and the like. Note that "orthogonal" is not limited to being perpendicular or orthogonal in a strict sense and includes being substantially orthogonal or perpendicular, allowing for certain inclinations in the range to such an extent that it allows the tool to be operated as intended.

Furthermore, in the sensor bracket of the present disclosure, preferably, the spring mount portion projects outwards from a lateral side of the bracket body, and the spring member is attached to a projection.

According to such a configuration, when the operator dismounts the spring member from the spring mount portion, by displacing the tool towards a direction in which the tool comes in contact with the displacement restriction portion, the windshield and the like can be reliably prevented from becoming damaged.

DESCRIPTION OF THE PREFERRED EMBODIMENTS

Figure 1:
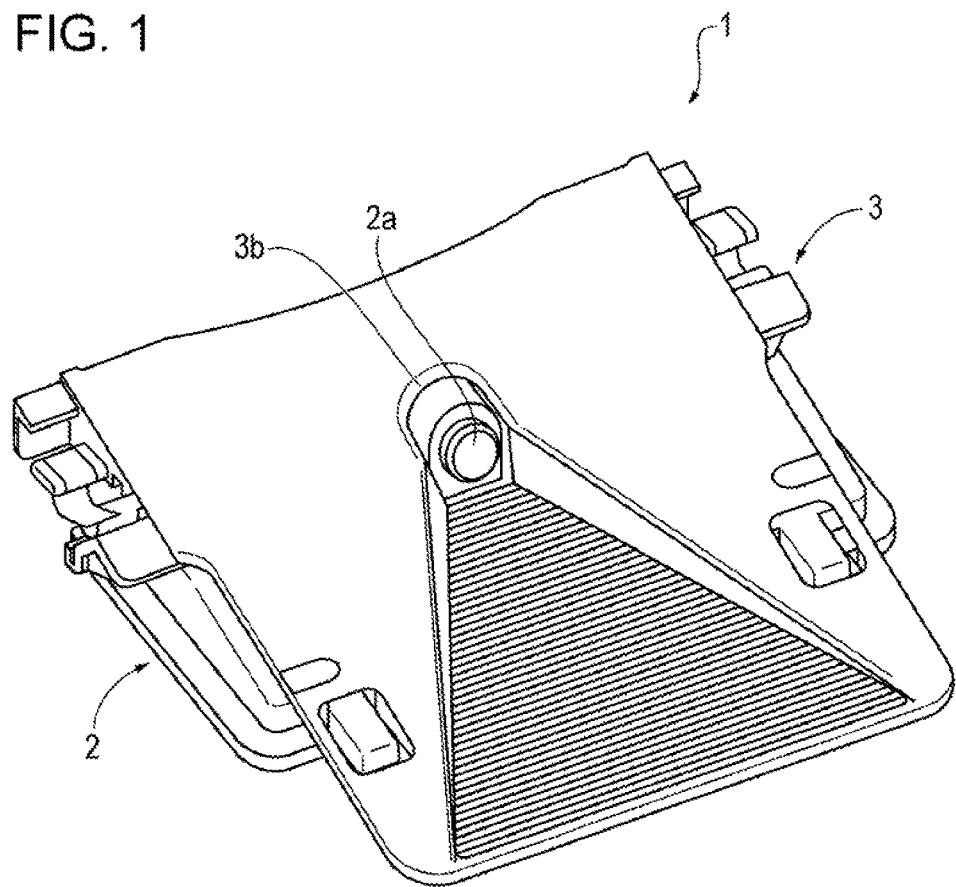
FIG. 1 is a diagram illustrating a configuration of a sensor bracket of the present disclosure on which a camera is mounted.

FIG. 1 illustrates a configuration in which a camera corresponding to a sensor of the present disclosure that detects the surroundings of a vehicle is mounted on a sensor bracket of the present disclosure. Hereinafter, the above configuration is referred to as a camera unit 1.

FIG. 1 is a perspective view of the camera unit 1 viewed obliquely from above. The camera unit 1 includes a camera 2 that is a sensor that performs imaging of an image in front of the vehicle, and a bracket 3 that is fixed to the windshield of the vehicle by being adhered thereon. Note that, hereinafter, description is given while the front of the vehicle is a front direction (a front side).

As illustrated in the drawings, the camera 2 is mounted on the bracket 3 from a lower side of the bracket 3 with an engaging mechanism described later. An opening 3b into which a lens 2a of the camera 2 is inserted is provided on an upper surface of the bracket 3. With the above, the camera 2 is capable of performing imaging of an image in front of the vehicle.

Figure 2:
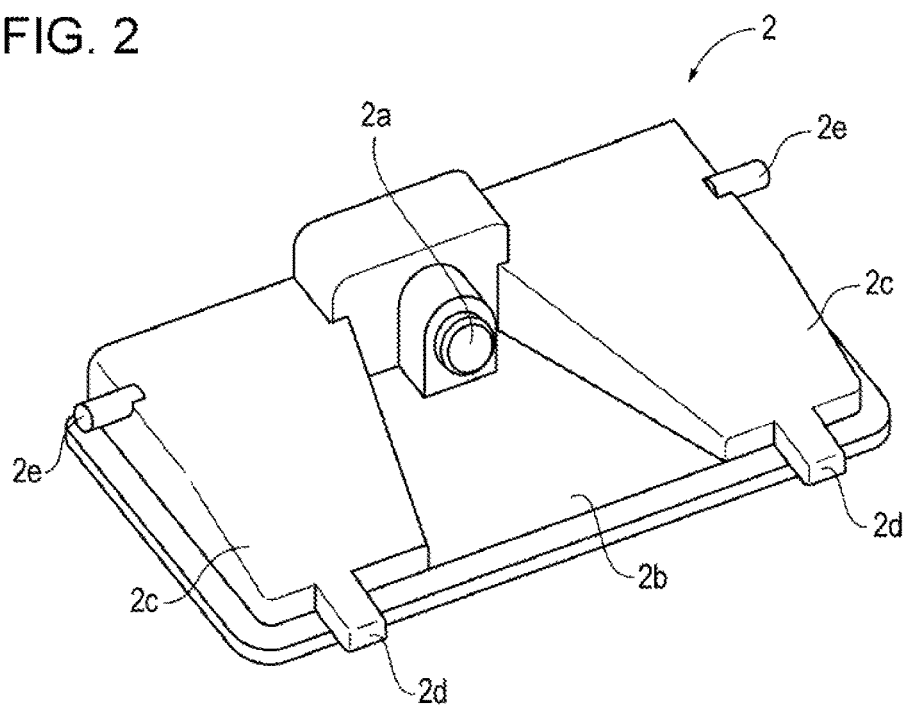
FIG. 2 is a perspective view of the whole camera.

Next, FIG. 2 is a perspective view of the camera 2 viewed obliquely from above. The lens 2a is attached to an upper surface of the camera 2. Furthermore, a groove portion 2b that widens at an angle towards the front is formed on a front side of the lens 2a. While the details will be described later, a cavity 3a' that has a shape that is the same as that of the groove portion 2b is formed in the upper surface of the bracket 3 as well, so that the field of view of the lens 2a is not blocked.

Furthermore, both sides of the upper surface of the camera 2 are inclination portions 2c that incline downwards towards the front side. Since the front side of the bracket 3 is down when the bracket 3 is fixed to the windshield, by forming the inclination portions 2c on the upper surface of the camera 2, the entire upper surface of the camera 2 comes in contact with the bracket 3. Note that hook portions 2d are provided at the front end of the camera 2 and are engaged with hole portions 3c of the bracket 3 described later.

An engagement protrusion 2e is provided on a rear surface of the camera 2. The engagement protrusion 2e is a member for mounting the camera 2 on the bracket 3. While the details will be described later, in a state in which the camera 2 is mounted on the bracket 3, the engagement protrusion 2e presses flat springs 4 (spring members of the present disclosure) included in the bracket 3, and the lock portions 3g press, from below, the engagement protrusion 2e that has received biasing force and fixes the camera 2 to the bracket 3.

Figure 3:
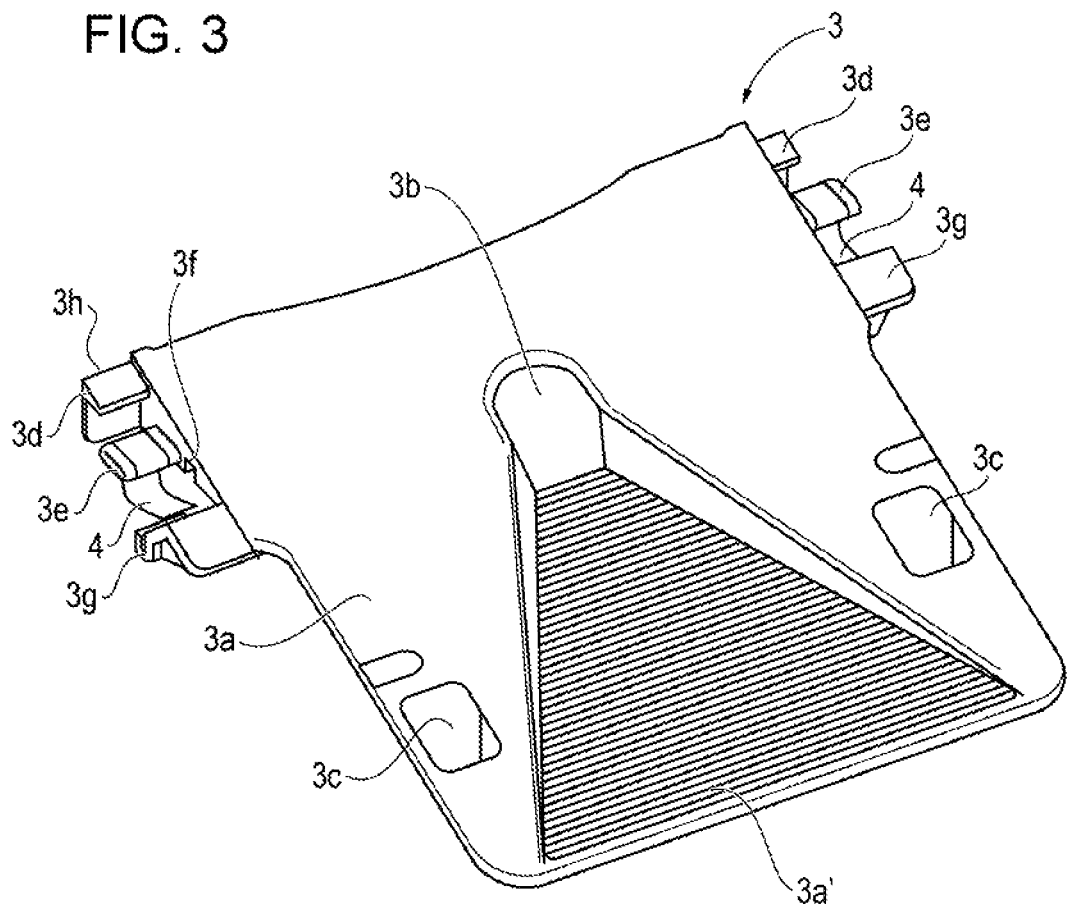
FIG. 3 is a perspective view of an upper surface side of the entire bracket.
Figure 4:
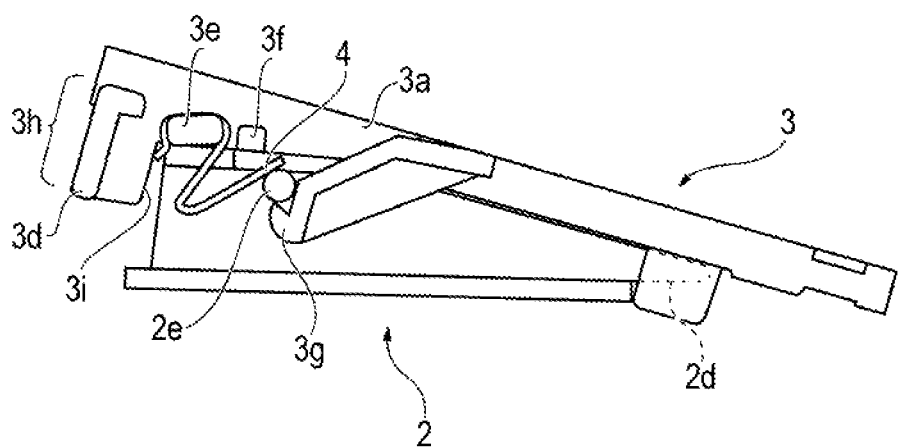
FIG. 4 is a side view of the bracket on which the camera has been mounted.
Figure 5:
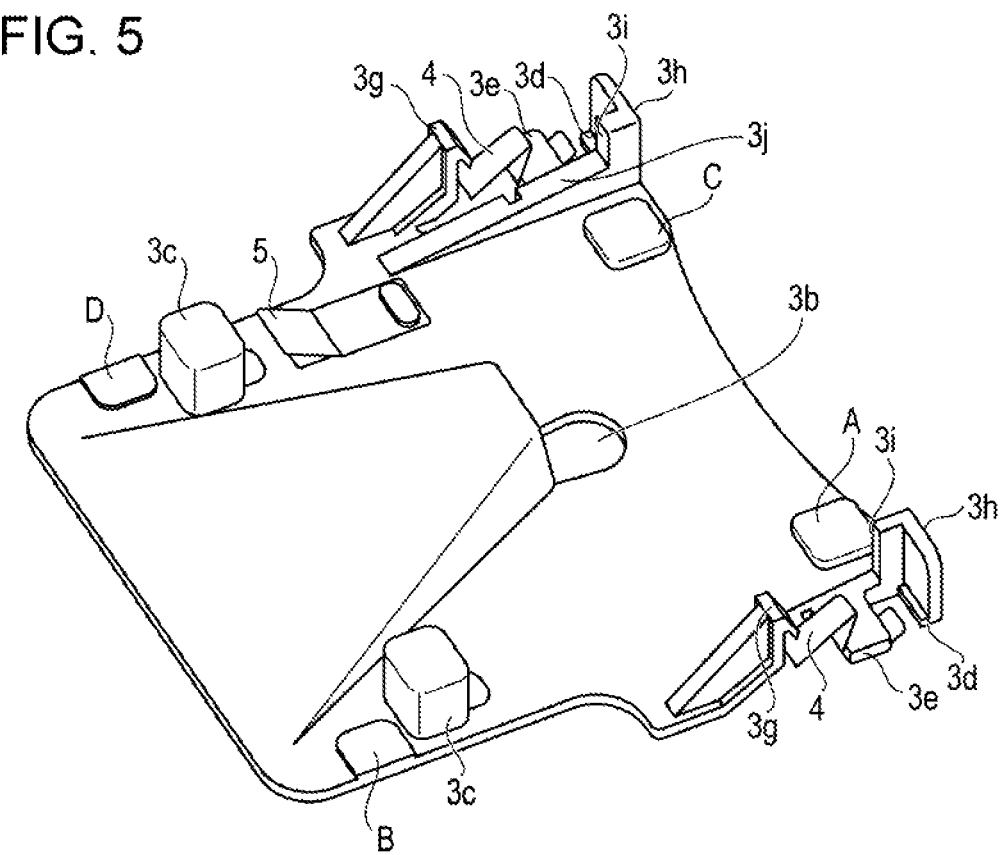
FIG. 5 is a perspective view of a lower surface side of the entire bracket.

Referring next to FIGS. 3 to 5, a structure of the bracket 3 will be described.

FIG. 3 is a perspective view of the upper surface side of the bracket 3 viewed obliquely from above. The opening 3b is provided at substantially the middle of a planar portion 3a of the upper surface of the bracket 3, and the cavity 3a' that widens at an angle towards the front is formed on the front side of the opening 3b.

The cavity 3a' has a stray light shielding structure (an antireflective shape) in which a number of grooves are formed so that the reflected light is not directly incident on the lens 2a. The cavity 3a' is slightly curved at the distal end side of the bracket 3 in a direction away from the windshield when the bracket 3 is attached to the windshield. With the above, only the bracket 3 can be seen from the black ceramic cutaway of the windshield; accordingly, the well-formed appearance can be maintained.

Furthermore, the hole portions 3c with which the hook portions 2d of the camera 2 are engaged are formed at both sides of the cavity 3a'. The hole portions 3c protrude towards the undersurface side of the bracket 3, and only the rear portions are open. Accordingly, when the camera 2 is mounted on the bracket 3, the hook portions 2d are accommodated in the recessed portions of the hole portions 3c (see FIG. 4).

An engaging mechanism to which the engagement protrusion 2e of the camera 2 is engaged is formed on the rear surface of the bracket 3. Specifically, as illustrated in FIG. 4 as well, the engaging mechanism includes, in the order from the rear end side of the bracket 3, stoppers 3d, projections 3e for the springs, and the lock portions 3g.

The stoppers 3d are restriction members each corresponding to a displacement restriction portion or a wall portion of the present disclosure that avoid a tool from hitting the windshield when the flat springs 4 attached to the projections 3e for the springs are dismounted. As illustrated in FIG. 4, the rear end portions of the flat springs 4 (made of aluminum, for example), which are attached to the projections 3e for the springs so as to be wound therearound, slightly project towards the stoppers 3d.

When dismounting the flat springs 4 from the projections 3e for the springs after the camera 2 has been separated from the bracket 3, the operator needs to press the rear end portions of the flat springs 4 from the lower side with a tool, such as a slotted screwdriver. In so doing, the L-shaped wall portions of the stoppers 3d function to restrict the displacement of the tool so that the tool having momentum does not damage the windshield by moving through to the windshield.

Recesses 3f are structures used when the operator attaches the flat springs 4 to the projections 3e for the springs, and are formed at positions adjacent to the projections 3e for the springs. The flat springs 4 can be fitted (temporarily fitted) into the projections 3e for the springs to a certain degree by pressing the flat springs 4 from the upper side of the projections 3e for the springs with the tool.

However, if the flat springs 4 are not completely fitted into the projections 3e for the springs, the flat springs 4 will come off when pressed by the engagement protrusion 2e of the camera 2. Accordingly, the operator completely fits each flat spring 4 to the corresponding projection 3e for the springs by pressing the flat spring by rotating the tool while the tip of the tool is abutted against the corresponding recess 3f. By receiving the tip of the tool in the recess 3f, the displacement of the tool is restricted and, accordingly, the windshield and the like are not damaged during the operation. In other words, formation of the stoppers 3d and the recesses 3f in the bracket 3 enables the operator to perform the operation at ease when, due to damage and plastic deformation, replacing the flat springs 4.

The lock portions 3g are members that fix the camera 2 in the up-down direction when the camera 2 is mounted on the bracket 3. The projections 3e for the springs are provided on the lateral side of the bracket 3 so as to project externally with respect to the stoppers 3d, and the flat springs 4 are attached to the projections. Furthermore, the lock portions 3g receive biasing force from the flat springs 4 through the engagement protrusion 2e of the camera 2.

When the camera 2 is mounted on the bracket 3, the operator slides the camera 2 so that the hook portions 2d of the camera 2 enter the hole portions 3c of the bracket 3 and, further, fixes the camera 2 such that the engagement protrusion 2e of the camera 2 presses the flat springs 4 upwards. In so doing, the engagement protrusion 2e moves while abutting against the undersides of the lock portions 3g and reaches a position where the engagement protrusion 2e presses the flat springs 4.

Furthermore, as illustrated in FIG. 4, the engagement protrusion 2e is pressed downwards with the biasing force of the flat springs 4 and the engagement protrusion 2e is caught by the distal end of the lock portions 3g. In other words, the lock portions 3g guide the engagement protrusion 2e to the engagement position. Since the flat springs 4 biases the engagement protrusion 2e downwards within the elastic deformation range, the camera 2 can be mounted on the bracket 3 in a stable manner.

On the other hand, when separating the camera 2 from the bracket 3, the operator abuts a finger against a rear outer wall 3h, which is behind the stopper 3d, and rearwardly pulls out the camera 2; accordingly, the flat springs 4 are pressed upwards and the engagement protrusion 2e is detached from the lock portions 3g. In other words, the camera 2 can be separated from the bracket 3 by sliding the camera 2 rearwardly in one direction.

Furthermore, immediately before the camera 2 is separated from the bracket 3, the rear end of the camera 2 abuts against vertical ribs 3i positioned between the stoppers 3d and the projections 3e for the springs. Since the vertical ribs 3i are positioned on the trajectory (extending in the sliding direction) of the dismounted camera 2, movement of the camera 2 is restricted such that when the camera 2 is separated from the bracket 3, the camera 2 is prevented from abruptly moving out. Furthermore, since the movement of the camera 2 is restricted by the vertical ribs 3i, unnecessary stress is not applied to the flat springs 4 any more when the camera 2 is separated from the bracket 3. Accordingly, plastic deformation of the flat springs 4 can foe prevented from occurring.

FIG. 5 is a perspective view of the lower surface side of the bracket 3 viewed obliquely front above. The opening 3b is provided in substantially the middle of the lower surface of the bracket 3, and a projecting structure 3j is provided at a position lateral to the opening 3b. Since the shape of the lower surface of the bracket 3 is the same as the shape of the upper surface of the camera 2, the upper surface of the camera 2 abuts against the bracket 3 in a wide area when the camera 2 is mounted on the bracket 3. With the above, the pressure of the camera 2 during attachment does not concentrate on a specific position and the camera 2 and the bracket 3 can be prevented from becoming damaged.

A bottom-plate spring 5 that biases the camera 2 downwards (the upper direction in FIG. 5) is attached on the rear side (the upper side of the figure) of the hole portions 3c. Although the bracket 3 of the present exemplary embodiment only has a single bottom-plate spring 5, two bottom-plate springs 5 may be provided on the rear side of the two hole portions 3c.

Furthermore, the vertical ribs 3i are provided between the stoppers 3d and the projections 3e for the springs. Although narrow in width, the vertical ribs 3i include wall surfaces that are orthogonal to the sliding direction in which the camera 2 is separated.

Reference surfaces A to D that are cut in a planar manner and that are parallel to each other are provided in the four corners of the bracket 3 on the lower surface side. Furthermore, when the bracket 3 is attached to a curved windshield, portions in the planar portion 3a that are opposite the reference surfaces A to D are, as adhesion surfaces, adhered to the windshield with double-sided tapes. In so doing, there are cases in which the bracket 3 is inclined slightly; however, by measuring the distances between the reference surfaces A to D and the windshield, the inclination of the bracket 3 with respect to the windshield can be measured.

Figure 6:
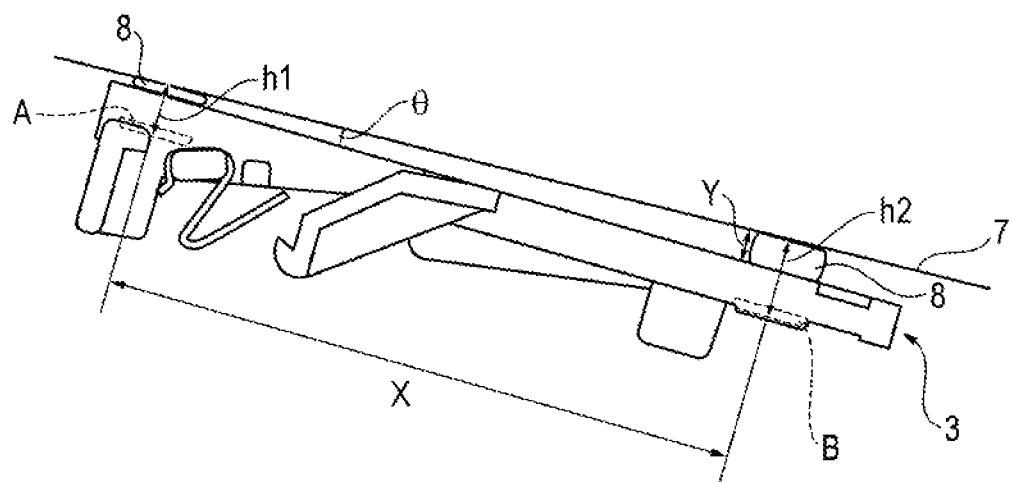
FIG. 6 is a diagram illustrating a state in which the bracket is attached to a windshield.

Hereinafter, a method for calculating the angle of the bracket 3 with respect to the windshield will be described. FIG. 6 illustrates a state in which the bracket 3 is adhered to a windshield 7 with a double-sided tape 8. In the above, X is the distance between the reference surface A and the reference surface B of the bracket 3. Furthermore, distances between each of the reference surfaces and the windshield, such as a distance h1 between the reference surface A and the windshield 7 and a distance h2 between the reference surface B and the windshield 7, are measured. Note that a distance Y of the gap on the upper side of the reference surface B in the drawing between the bracket 3 and the windshield 7 is the difference between the distance h2 and the distance h1, that is, |h2−h1|.

With the above, an inclination angle θ of the bracket 3 attached to the windshield 7 can be obtained by $$\tan \theta = Y/X. \quad (1)$$

Since the camera 2 mounted on the bracket 3 has the same inclination angle θ, correction of the axis deviation can be made easily.

In actuality, although there are double-sided tapes 8 (with a thickness of about 0.8 mm) above the reference surfaces A and B, a slight inclination created by the thickness of the double-sided tapes 8 can be absorbed. As described above, when controlling the inclination of the bracket 3, the inclination angle θ can be calculated and correction thereof can be made if there are (at least three) flat surfaces such as the reference surfaces A to D.

As described above, the camera unit 1 of the exemplary embodiment includes the camera 2 that detects the state in front of the vehicle, and the bracket 3 attached to the inner surface of the windshield of the vehicle, and the camera 2 is mounted on the bracket 3. Particularly, the stoppers 3d that, when the flat springs 4 that bias the camera 2 are dismounted from the projections 3e for the springs, restrict the displacement range of the tool are provided in the bracket 3. With the above, the flat springs 4 can be easily and safely replaced.

The exemplary embodiment described above is an example of the present disclosure and various modifications can be made. In the exemplary embodiment described above, while the camera 2, which serves as a sensor of the present disclosure that detects the state around the vehicle, has been illustrated, the sensor may be other types of sensors such as a radar device.

Furthermore, while the bracket 3 is made of metal, not limiting the material to any material, the bracket 3 may be molded of plastic or the like. While the engaging mechanism of the bracket 3 is positioned on the rear side of the bracket 3, there is no restriction in the position and, for example, the spring members and the lock portions may be provided at areas that cannot be partially or totally seen from the outside.

What is claimed is:

1. A sensor bracket comprising:
   a bracket body attached to an inner surface of a glass shield of a vehicle;

a sensor mounted on the bracket body and configured to detect a state around the vehicle;

a spring member provided in the bracket body, the spring member abutting against the sensor in a manner that biases the sensor in a direction that maintains a mounted state and position of the sensor with respect to the bracket body, the spring member being detachable from the bracket body with a tool by pushing a part of the spring member toward the inner surface of the glass shield; and a tool-displacement restriction portion provided in the bracket body at a position between said part of the spring member at which the tool is to be positioned and the inner surface of the glass shield such that the tool-displacement restriction portion provides a restricted tool-displacement space from said part of the spring member, which allows the tool to move toward the inner surface of the glass shield to dismount the spring member from the bracket body, but prevents the tool from contacting the glass shield.

2. The sensor bracket according to claim 1, wherein the tool-displacement restriction portion has a wall portion configured to guide the tool having a rod shape such that the wall portion can restrict an angle of the tool to substantially be orthogonal to the inner surface of the glass shield when with the tool is pushing the spring member.

3. The sensor bracket according to claim 1, wherein the bracket body has a spring mount portion to which the spring member is detachably attached, and wherein the spring mount portion is a projection projecting outwards from a lateral side of the bracket body, and the spring member is attached to the projection.

* * * * *